(12) United States Patent
Zheng et al.

(10) Patent No.: US 11,808,682 B1
(45) Date of Patent: Nov. 7, 2023

(54) OIL-GAS-WATER THREE-PHASE AUTOMATIC METERING DEVICE AND METHOD

(71) Applicant: Chengdu University of Technology, Chengdu (CN)

(72) Inventors: Jun Zheng, Chengdu (CN); Chuhao Chen, Chengdu (CN); Hongbo Liu, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 18/125,111

(22) Filed: Mar. 22, 2023

(30) Foreign Application Priority Data

Nov. 15, 2022 (CN) .......................... 202211427290.9

(51) Int. Cl.
*G01N 15/08* (2006.01)
*G05D 7/06* (2006.01)

(52) U.S. Cl.
CPC ..... *G01N 15/0806* (2013.01); *G01N 15/0826* (2013.01); *G05D 7/0688* (2013.01)

(58) Field of Classification Search
CPC .... G01N 15/00; G01N 15/08; G01N 15/0806; G01N 15/0826; G05D 7/0688
See application file for complete search history.

(56) References Cited

U.S. PATENT DOCUMENTS

2016/0356694 A1* 12/2016 Johnson ................. G01N 33/24

FOREIGN PATENT DOCUMENTS

EP          0718616 A1 *  6/1996    ......... G01N 15/0826

* cited by examiner

*Primary Examiner* — Nguyen Q. Ha
(74) *Attorney, Agent, or Firm* — CRGO Global; Steven M. Greenberg

(57) ABSTRACT

An oil-gas-water three-phase automatic metering device and method includes a liquid inlet pipe, a pump body, a degassing assembly, a water inlet assembly, first and second liquid storage pipes, a weighing assembly, and a control unit. The liquid inlet pipe, degassing assembly, one end of the first liquid storage pipe and one end of the second liquid storage pipe are connected to four valve ports of a first changeover valve, respectively. The water inlet assembly, one end of the pump body, the other end of the first liquid storage pipe, and the other end of the second liquid storage pipe are connected to four valve ports of a second changeover valve, respectively. The degassing assembly, the water inlet assembly and the other end of the pump body are in communication with the weighing assembly, and the pump body, degassing assembly and weighing assembly are communicatively connected to the control unit.

20 Claims, 1 Drawing Sheet

OIL-GAS-WATER THREE-PHASE AUTOMATIC METERING DEVICE AND METHOD

CROSS REFERENCE TO RELATED APPLICATIONS

This application claims priority under 35 U.S.C. § 119(a) to Chinese patent application CN 202211427290.9 filed on Nov. 15, 2022, the entire teachings of which are incorporated herein by reference.

BACKGROUND OF THE INVENTION

Field of the Invention

The present disclosure relates to the technical field of metrology, and in particular relates to an oil-gas-water three-phase automatic metering device and method.

Description of the Related Art

Laboratory core displacement simulation experiments are often conducted in the oil and gas industry to study the flowing law of oil and gas in the reservoirs, thus providing a scientific basis for accurately grasping the production performance of oil and gas wells, and formulating development plans and tapping measures. In such displacement experiments, the output fluid is often a to-be-measured fluid which is an oil-gas-water three-phase mixture to be detected. To study the permeability rule of the multi-phase fluid in the core, it is necessary to meter the output of each phase of fluid in real time at the outlet. However, experiments often show that one phase of fluid has a small volume, or the three phases interact to form an emulsion, causing difficulties in separation and other complex phenomena. Therefore, higher demands are placed on the accurate metering of three-phase fluids.

At present, the oil-gas-water three-phase metering device usually needs to separate the three phases by density difference in a metering tube with a large diameter, and then to conduct measurement separately. Such a device is low in automation degree due to its requirement of manual assistance in metering in general, and is low in metering accuracy due to the large influence of the diameter of the measuring tube, the separation speed and the flow rate of the to-be-measured fluid. At present, there is no effective means to accurately meter the oil-gas-water to-be-measured fluid which is difficult to separate.

BRIEF SUMMARY OF THE INVENTION

An objective of the present disclosure is to provide an oil-gas-water three-phase automatic metering device and method to solve the problems in the prior art, such that the volume measurement of the oil, gas and water are free of oil-water separation, and the measuring accuracy is high.

To achieve the objective above, the present disclosure provides the following solutions:

An oil-gas-water three-phase automatic metering device comprises a liquid inlet pipe, a pump body, a degassing assembly, a water inlet assembly, a first liquid storage pipe, a second liquid storage pipe, a weighing assembly, and a control unit. The liquid inlet pipe, the degassing assembly, one end of the first liquid storage pipe and one end of the second liquid storage pipe are connected to four valve ports of a first changeover valve, respectively; and the water inlet assembly, one end of the pump body, the other end of the first liquid storage pipe, and the other end of the second liquid storage pipe are connected to four valve ports of a second changeover valve, respectively. The degassing assembly, the water inlet assembly and the other end of the pump body are in communication with the weighing assembly, and the pump body, the degassing assembly and the weighing assembly are communicatively connected to the control unit.

Preferably, the first changeover valve can switch the communication between the liquid inlet pipe and the first liquid storage pipe to the communication between the liquid inlet pipe and the second liquid storage pipe while switching the communication between the degassing assembly and the second liquid storage pipe to the communication between the degassing assembly and the first liquid storage pipe. The second changeover valve can switch the communication between the first liquid storage pipe and the water inlet assembly to the communication between the first liquid storage pipe and the pump body while switching the communication between the second liquid storage pipe and the pump body to the communication between the second liquid storage pipe and the water inlet assembly.

Preferably, the first changeover valve and the second changeover valve are both planar four-way changeover valves, and the planar four-way changeover valves can be communicatively connected to the control unit.

Preferably, the degassing system comprises a closed container, a waterproof breathable pipe, a vacuum pump, and a vacuum manometer. The waterproof breathable pipe penetrates through the two ends of the closed container, one end of the waterproof breathable pipe is connected to the first changeover valve, and the other end of the waterproof breathable pipe communicates with the weighing assembly through a third liquid storage pipe. The vacuum pump and the vacuum manometer are hermetically connected to the closed container, and the vacuum pump and the vacuum manometer can be communicatively connected to the control unit.

Preferably, micropores are uniformly distributed on the wall of the waterproof breathable pipe, and the size of the micropores is larger than that of gas molecules and smaller than that of liquid molecules.

Preferably, the water inlet assembly comprises a water inlet pipe and an open water receiver. The lower end of the water receiver is connected to the water inlet pipe, the water inlet pipe communicates with the upper end of the weighing assembly, the water inlet pipe communicates with the second changeover valve by a tee-junction, the water inlet pipe is provided with a valve, the valve is located below the tee-junction, and the valve is a solenoid and can be communicatively connected to the control unit.

Preferably, the weighing assembly comprises an electronic scale and an open reservoir. The reservoir is placed on the electronic scale, and the electronic scale can be communicatively connected to the control unit.

Preferably, the tail end of a pipeline, communicating with the reservoir, of the pump body, and the tail end of a pipeline, communicating with the reservoir, of the degassing assembly are located at the bottom of the reservoir.

The present disclosure further discloses an oil-gas-water three-phase automatic metering method, which is based on the oil-gas-water three-phase automatic metering device above, and comprises the following steps:

Step one, experiment preparation a reservoir is filled with enough water, and all pipelines are filled with water by using a peristaltic pump, an initial detection weight of an electronic scale is recorded as G0 by a control unit, a first changeover valve and a second changeover valve are switched to a pipeline circulation state that a first liquid storage pipe is in forward water drainage, a valve below a water inlet pipe is in an open state, a vacuum pump is turned on, and a closed container of a degassing system is kept at a vacuum pressure in the whole experiment process;

step two, forward water drainage the to-be-measured fluid enters the first liquid storage pipe through a liquid inlet pipe for forward water drainage, with the time interval of t, and the detection weight of the electronic scale is recorded as $G_1$ by the control unit, then the weight increment of the single forward water drainage is $$\Delta G_1 = G_1 - G_0$$

step three, combination of forward water drainage and reverse liquid drainage the first changeover valve and the second changeover valve are switched to a pipeline circulation state that a second liquid storage pipe is in forward water drainage, the valve is closed, the to-be-measured fluid enters the second liquid storage pipe for forward water drainage, and the drained water is collected into a water receiver; meanwhile, water is injected into the first liquid storage pipe by the pump body for reverse liquid drainage, then the to-be-measured fluid is gradually drained into a waterproof breathable pipe of the degassing system, then the to-be-measured fluid only has the oil-water fluid left as the gas-phase component thereof is removed by vacuumizing; when the volume of water drainage by the peristaltic pump is greater than the volume of the to-be-measured fluid but smaller than the volume of a third liquid storage pipe connected to the degassing system, the to-be-measured fluid completely enters the degassing system to complete degassing, but does not enter the reservoir; the stable detection weight of the electronic scale at the moment is recorded as $G_2$ by the control unit, the reduced weight of the water in the reservoir is $\Delta G_2 = G_1 - G_2$, and the reduced volume of the water is the volume of the gas in the to-be-measured fluid; the first liquid storage pipe is subjected to continuous drainage such that the to-be-tested fluid is completely drained into the reservoir from the liquid storage pipe, then the peristaltic pump is turned off, the stable detection weight of the electronic scale at the moment is recorded as $G_3$ by the control unit, $\Delta G_3 = G_3 - G_0$, $\Delta G_3$ is the total mass of the oil and water in the section of to-be-measured fluid; after the $G_3$ is completely metered, the valve is opened, the water in the water receiver flows into the reservoir under the action of gravity, and meanwhile, the subsequent water in forward drainage continuously flows into the reservoir to be weighed;

step four, calculation of the volume of oil, gas and water by forward and reverse drainage weighing method a calculation principle of the control unit is that the volume of this section of to-be-measured fluid entering the liquid storage pipe can be calculated by forward piston-like water drainage of the to-be-measured fluid and the weighing of the drained water; the to-be-measured fluid is drained into the degassing system by reverse water injection, thus degassing is completed and the volume occupied by original gas is filled with water; the gas phase volume in the to-be-measured fluid can be calculated by metering the reduced weight of water; the mass of the oil-water fluid can be obtained by completely draining and weighing the degassed oil-water fluid, and the volume of three-phase fluid in the to-be-measured fluid can be calculated respectively by combining the single-phase fluid density in the to-be-measured fluid.

A specific calculation method is as follows: assuming that the volumes of the oil, gas and water in the to-be-measured fluid entering a certain liquid storage pipe are respectively $V_o$, Vg and Vw when the time interval is t, the densities of the oil and water are respectively known as $\rho_o$ and $P_w$, and the mass of the water drained in the forward water drainage stage of the section of to-be-measured fluid is $\Delta G_1 = G_1 - G_0$, thus $$\Delta G_1 = (V_o + V_g + V_w)\rho_w \tag{1}$$

after the to-be-measured fluid is degassed, $\Delta G_2 = G_1 - G_2$, and at the moment, the reduced volume of the water in the reservoir is the volume of the gas in the to-be-measured fluid, thus $$V_g = \frac{\Delta G_2}{\rho_w} \tag{2}$$

after the degassed oil-water fluid is completely drained and weighed, the weight increased with respect to the original G0 in the reservoir is $\Delta G_3 = G_3 - G_0$, then the real weight of the oil-water fluid can be obtained as follows:

$$\Delta G_3 = V_o \rho_o + V_w \rho_w \tag{3}$$

the volume $V_o$, Vg, Vw of the oil, gas and water output in the experiment in the time interval t can be calculated by the joint solution of formulas (1), (2) and (3).

Preferably, the time interval t is any duration which enables the total volume of single water drainage of forward water drainage to be smaller than the total volume of the first liquid storage pipe. When the degassed oil-water to-be-measured fluid is completely drained out from the third liquid storage pipe connected to the degassing system, the directions of the first changeover valve and the second changeover valve are switched at the same time to degas and meter the to-be-measured fluid entering the first liquid storage pipe and the second liquid storage pipe, respectively, and two parallel storage pipelines for the to-be-measured fluid are obtained through the switching of the first changeover valve and the second changeover valve, such that the forward water drainage and the reverse liquid drainage are able to be conducted at the same time to achieve continuous real-time metering of the to-be-measured fluid until the experiment is ended.

Compared with the prior art, the present disclosure has the following technical effects:

The device disclosed by the present disclosure can enable the fluid metering of emulsified liquid without separating the oil-water two-phase fluid in the to-be-measured fluid. Through the design of the liquid storage pipelines and the changeover valves, the forward water drainage and the reverse liquid drainage can be conducted simultaneously so as to achieve continuous real-time metering.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
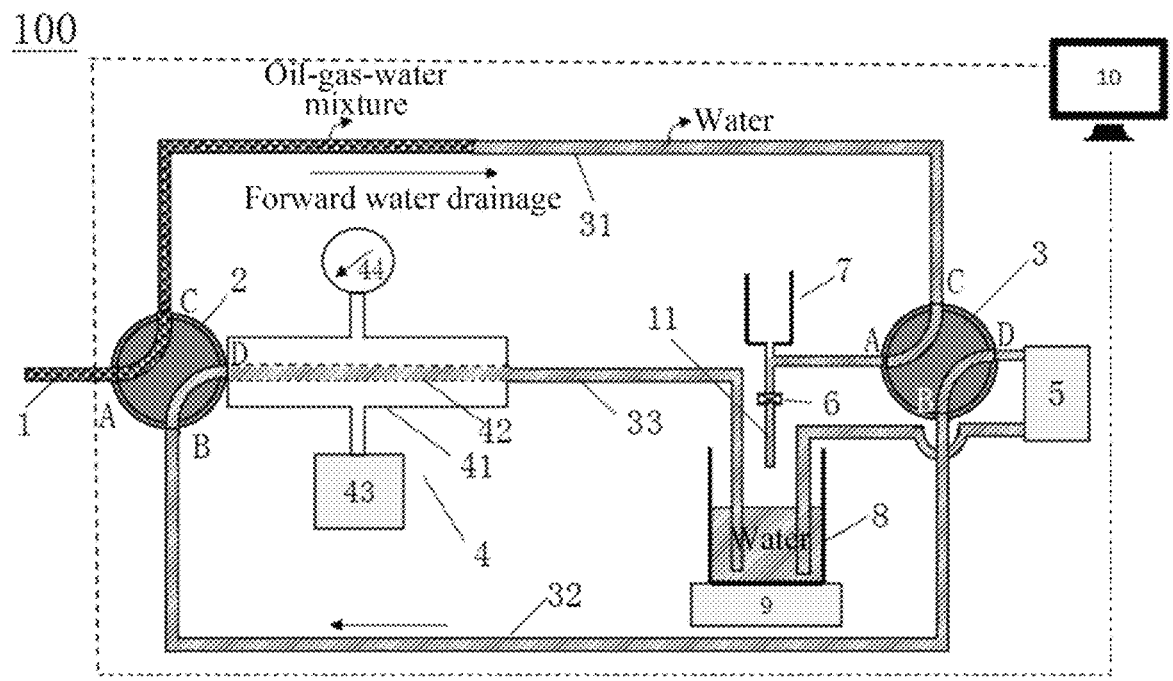
FIG. 1 is a structure diagram of one state of an oil-gas-water three-phase automatic metering device in accordance with the present disclosure.

In the drawings: 1-liquid inlet pipe; 2-first changeover valve; 3-second changeover valve; 31-first liquid storage pipe; 32-second liquid storage pipe; 33-third liquid storage pipe; 4-degassing system; 41-closed container; 42-waterproof breathable pipe; 43-vaccum pump; 44-vaccum manometer; 5-pump body; 6-valve; 7-water receiver; 8-reservoir; 9-electronic scale; 10-control unit; 11-water inlet pipe; 100-water-oil-gas three-phase automatic metering device.

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide an oil-gas-water three-phase automatic metering device and method to solve the problems in the prior art, such that the volume measurement of the oil, gas and water are free of oil-water separation, and the metering accuracy is high.

To make the objectives, features and advantages of the present disclosure more apparently and understandably, the following further describes the present disclosure in detail with reference to the accompanying drawings and specific embodiments.

Figure 2:
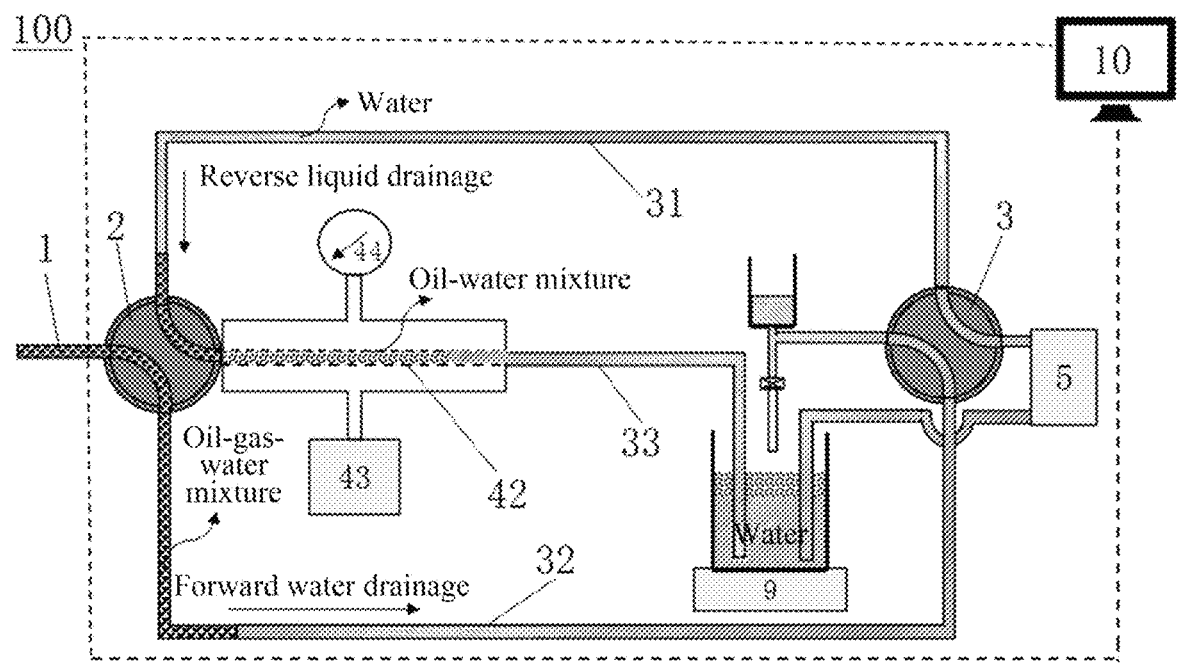
FIG. 2 is a structure diagram of another state of an oil-gas-water three-phase automatic metering device in accordance with the present disclosure.

As shown in FIG. 1 to FIG. 2, the embodiment provides an oil-gas-water three-phase automatic metering device 100, comprising a liquid inlet pipe 1, a pump body 5, a degassing assembly, a water inlet assembly, a first liquid storage pipe 31, a second liquid storage pipe 32, a weighing assembly, and a control unit 10. The liquid inlet pipe 1, the degassing assembly, one end of the first liquid storage pipe 31 and one end of the second liquid storage pipe 32 are connected to four valve ports of a first changeover valve 2, respectively; and the water inlet assembly, one end of the pump body 5, the other end of the first liquid storage pipe 31 and the other end of the second liquid storage pipe 32 are connected to four valve ports of a second changeover valve 3, respectively. The degassing assembly, the water inlet assembly and the other end of the pump body 5 are in communication with the weighing assembly, and the pump body 5, the degassing assembly and the weighing assembly are communicatively connected to the control unit 10.

The first changeover valve 2 can switch the communication between the liquid inlet pipe 1 and the first liquid storage pipe 31 to the communication between the liquid inlet pipe 1 and the second liquid storage pipe 32 while switching the communication between the gas removal assembly and the second liquid storage pipe 32 to the communication between the gas removal assembly and the first liquid storage pipe 31. The second changeover valve 3 can switch the communication between the first liquid storage pipe 31 and the water inlet assembly to the communication between the first liquid storage pipe 31 and the pump body 5 while switching the communication between the second liquid storage pipe 32 and the pump body 5 to the communication between the second liquid storage pipe 32 and the water inlet assembly. The first changeover valve 2 and the second changeover valve 3 are both planar four-way changeover valves, each including four valve ports which are A, B, C, and D, respectively, which can switch a mutual communication state of AC as well as BD to a mutual communication state of AB as well as CD. The planar four-way changeover valves can be communicatively connected to the control unit 10 to achieve automatic control and calculation.

The degassing system 4 comprises a closed container 41, a waterproof breathable pipe 42, a vacuum pump 43, and a vacuum manometer 44. The waterproof breathable pipe 42 penetrates through the two ends of the closed container 41 and are hermetically connected. One end of the waterproof breathable pipe 42 is connected to the first changeover valve 2, and the other end of the waterproof breathable pipe 42 communicates with the weighing assembly through a third liquid storage pipe 33. The vacuum pump 43 and the vacuum manometer 44 are hermetically connected to the closed container 41, and the vacuum pump 43 and the vacuum manometer 44 can be communicatively connected to the control unit 10. The waterproof breathable pipe 42 is located in the middle of the closed container 41, the gas can be separated into the closed container 41 by a negative pressure atmosphere created by the vacuum pump 43. Micropores are uniformly distributed on the wall of the waterproof breathable pipe, and the size of the micropores is larger than that of gas molecules and smaller than that of liquid molecules, thus the gas may freely pass through the wall of the waterproof breathable pipe 42, but the liquid cannot. The waterproof breathable pipe 42 may be an expanded polytetrafluoroethylene pipe (ePTFE pipe). The first liquid storage pipe 31, the second liquid storage pipe 32 and the third liquid storage pipe 33 are preferably pipes smooth in wall and small in diameter. Generally, the pipeline which is made of stainless steel or glass and has an inner diameter of 3 mm to 6 mm is preferred, which is more convenient for piston-like displacement of mixed fluid and water in the pipeline.

The water inlet assembly comprises a water inlet pipe 11 and an open water receiver 7. The lower end of the water receiver 7 is connected to the water inlet pipe 11, the water inlet pipe 11 communicates with the upper end of the weighing assembly, the water inlet pipe 11 communicates with the second changeover valve 3 by a tee-junction, the water inlet pipe 11 is provided with a valve 6, the valve 6 is preferably a solenoid. The valve 6 is located below the tee-junction and can be communicatively connected to the control unit 10. The weighing assembly comprises an electronic scale 9 and an open reservoir 8. The reservoir 8 is placed on the electronic scale 9, and the electronic scale 9 can be communicatively connected to the control unit 10. The tail end of a pipeline, communicating with the reservoir 8, of the pump body 5, and the tail end of a pipeline, communicating with the reservoir 8, of the degassing assembly are located at the bottom of the reservoir 8 to guarantee that the two end parts are always located below the water level, thus facilitating the water suction and backflow of the third liquid storage pipe 33 and the pump body 5.

In accordance with the embodiment, the reservoir 8 is a beaker, the water receiver 7 is a liquid storage cup, the control unit 10 is a computer, the pump body 5 is a peristaltic pump, and the valve 6, the electronic scale 9, the peristaltic pump, the vacuum manometer 44 and the vacuum pump 43 are all communicatively connected to the computer for automatic reading and control. The embodiment is simple in structure, high in metering accuracy, high in automation degree, and capable of achieving automatic metering of oil, gas and water without conducting oil-water separation. The defect that the existing technology is cannot be applied to the metering of the emulsified liquid due to its poor metering accuracy is solved.

Embodiment 2

The embodiment discloses an oil-gas-water three-phase automatic metering method, which is based on the oil-gas-water three-phase automatic metering device 100 of the embodiment 1, and comprises the following steps:

Step One, Experiment Preparation

A reservoir 8 (beaker) is filled with enough water, and all pipelines are filled with water by using a peristaltic pump, an initial detection weight of an electronic scale 9 is recorded as $G_0$ by a control unit 10, a first changeover valve 2 and a second changeover valve 3 are switched to a pipeline circulation state that a first liquid storage pipe 31 is in forward water drainage, the position is as shown in FIG. 1. A valve 6 below a water inlet pipe 11 is in an open state, and a vacuum pump 43 is turned on, a closed container 41 of a degassing system 4 is kept at a vacuum pressure in the whole experiment process, the negative pressure is kept to facilitate degassing.

Step Two, Forward Water Drainage

The to-be-measured fluid enters the first liquid storage pipe 31 through a liquid inlet pipe 1 for forward water drainage, with the time interval of t, and the detection weight of the electronic scale 9 is recorded as $G_1$ by the control unit 10, then the weight increment of single forward water drainage is $\Delta G_1 = G_1 - G_0$ The time interval t is chosen arbitrarily, but should ensure that the total volume ($\Delta G_1 / \rho_w$) of single drained water is smaller than the total volume of the first liquid storage pipe 31.

Step Three, Combination of Forward Water Drainage and Reverse Liquid Drainage

The first changeover valve 2 and the second changeover valve 3 are switched to a pipeline circulation state that a second liquid storage pipe 32 is in forward water drainage, the position is as shown in FIG. 2, the valve 6 is closed, the to-be-measured fluid enters the second liquid storage pipe 32 for forward water drainage, and the drained water is collected into a water receiver 7. Meanwhile, water is injected into the first liquid storage pipe 31 by the pump body 5 for reverse liquid drainage, the to-be-measured fluid is gradually drained into a waterproof breathable pipe 42 of the degassing system 4, then the to-be-measured fluid only has the oil-water fluid left as the gas-phase component thereof is removed by vacuumizing. When the volume of water drainage of the peristaltic pump is greater than the volume ($\Delta G_1 / \rho_w$) of the to-be-measured fluid but smaller than the volume of a third liquid storage pipe 33 connected to the degassing system 4, or the length of the waterproof breathable pipe 42 and the degassing system is increased to make the to-be-measured fluid entering at one time subjected to static degassing completely in the waterproof breathable pipe 42, the to-be-measured fluid completely enters the degassing system 4 to complete the degassing at the moment, but does not enter the reservoir 8. The stable detection weight of the electronic scale 9 at the moment is recorded as $G_2$ by the control unit 10, the reduced weight of the water in the reservoir 8 is $\Delta G_2 = G_1 - G_2$, and the reduced water volume is the volume of the gas in the to-be-measured fluid; the first liquid storage pipe 31 is subjected to continuous drainage such that the to-be-tested fluid is completely drained into the reservoir 8 from the liquid storage pipe, then the peristaltic pump is turned off, the stable detection weight of the electronic scale 9 at the moment is recorded as $G_3$ by the control unit 10, $\Delta G_3 = G_3 - G_0$, $\Delta G_3$ is the total mass of the oil and water in this section of to-be-measured fluid. After the $G_3$ is completely metered, the valve 6 is opened, the water in the water receiver 7 flows into the reservoir 8 under the action of gravity, and meanwhile, the subsequent water subjected to forward drainage continuously flows into the reservoir 8 to be weighed. At the moment, the detection weight of the electronic scale 9 is recorded as new $G_0'$ by the control unit 10 for the next measurement.

Step Four, Calculation of the Volume of Oil, Gas and Water by Forward and Reverse Drainage Weighing Method The calculation principle of the control unit 10 is that the volume of this section of to-be-measured fluid entering the liquid storage pipe can be calculated by forward piston-like water drainage of the to-be-measured fluid and the weighing of the drained water. The to-be-measured fluid is drained into the degassing system 4 by reverse water injection, thus degassing is completed and the volume occupied by original gas is filled with water; the gas phase volume in the to-be-measured fluid can be calculated by metering the reduced weight of water, the mass of the oil-water fluid can be obtained by completely draining and weighing the degassed oil-water fluid, and the volume of three-phase fluid in the to-be-measured fluid can be calculated respectively by combining the single-phase fluid density in the to-be-measured fluid.

A specific calculation method is as follows: assuming that the volume of the oil, gas and water in the to-be-measured fluid entering a certain liquid storage pipe are respectively $V_o$, $V_g$ and $V_w$ when the time interval is t, the densities of the oil and water are respectively known as $\beta_o$ and $\rho_w$, and the mass of the water drained in the forward water drainage stage of this section of to-be-measured fluid is $\Delta G_1 = G_1 - G_0$ thus $$\Delta G_1 = (V_o + V_g + V_w)\rho_w \quad (1)$$

after the to-be-measured fluid is degassed, $\Delta G_2 = G_1 - G_2$, and at the moment, the reduced volume of the water in the reservoir 8 is the volume of the gas in the to-be-measured fluid, thus $$V_g = \frac{\Delta G_2}{\rho_w} \quad (2)$$

after the degassed oil-water fluid is completely drained and weighed, the weight increased with respect to the original $G_0$ in the reservoir 8 is $\Delta G_3 = G_3 - G_0$, then the real weight of the oil-water fluid can be obtained as follows:

$$\Delta G_3 = V_o \rho_o + V_w \rho_w \quad (3)$$

the volume $V_o$, $V_g$, $V_w$, of the oil, gas and water output in the experiment in the time interval t can be calculated by the joint solution of formulas (1), (2) and (3).

The time interval t is any duration which enables the total volume of single water drainage of forward water drainage to be smaller than the total volume of the first liquid storage pipe 31, and the total flow rate of the to-be-measured fluid is that $V_{total} = (V_o + V_g + V_w)/t$, and the flow rates of the oil, gas and water are respectively as follows: $v_o = V_o/t$, $v_g = Vg/t$, $v_w = V_w/t$. When the Degassed Oil-Water to-be-Measured Fluid is completely drained out from the third liquid storage pipe 33 connected to the degassing system 4, the directions of the first changeover valve 2 and the second changeover valve 3 are switched at the same time to degas and meter the to-be-measured fluid entering the first liquid storage pipe 31 and the second liquid storage pipe 32, respectively. Two parallel storage pipelines for the to-be-measured fluid are obtained through the switching of the first changeover valve 2 and the second changeover valve 3, such that the forward water drainage and the reverse liquid drainage can be conducted at the same time to achieve continuous real-time metering of the to-be-measured fluid until the experiment is ended.

In accordance with the embodiment, the metering method does not need to separate the oil-water two-phase fluid in the mixed liquid, thus the metering of the volume and water and oil in the emulsified liquid can be conducted. Through the design of obtaining two pipelines through the switching of the planar four-way changeover valves, the forward drainage and the reverse drainage can be conducted at the same time so as to achieve continuous real-time metering of fluid.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. An oil-gas-water three-phase automatic metering device, comprising
   a liquid inlet pipe, a pump body, a degassing assembly, a water inlet assembly, a first liquid storage pipe, a second liquid storage pipe, a weighing assembly, and a control unit, wherein the liquid inlet pipe, the degassing assembly, one end of the first liquid storage pipe and one end of the second liquid storage pipe are connected to four valve ports of a first changeover valve, respectively;
   the water inlet assembly, one end of the pump body, the other end of the first liquid storage pipe, and the other end of the second liquid storage pipe are connected to four valve ports of a second changeover valve, respectively;
   the degassing assembly, the water inlet assembly and the other end of the pump body are in communication with the weighing assembly, and the pump body, the degassing assembly and the weighing assembly are communicatively connected to the control unit.

2. The oil-gas-water three-phase automatic metering device according to claim 1, wherein the first changeover valve is able to switch the communication between the liquid inlet pipe and the first liquid storage pipe to the communication between the liquid inlet pipe and the second liquid storage pipe while switching the communication between the degassing assembly and the second liquid storage pipe to the communication between the degassing assembly and the first liquid storage pipe; and the second changeover valve is able to switch the communication between the first liquid storage pipe and the water inlet assembly to the communication between the first liquid storage pipe and the pump body while switching the communication between the second liquid storage pipe and the pump body to the communication between the second liquid storage pipe and the water inlet assembly.

3. The oil-gas-water three-phase automatic metering device according to claim 1, wherein the first changeover valve and the second changeover valve are both planar four-way changeover valves, and the planar four-way changeover valves are communicatively connected to the control unit.

4. The oil-gas-water three-phase automatic metering device according to claim 1, wherein the degassing system comprises a closed container, a waterproof breathable pipe, a vacuum pump, and a vacuum manometer; the waterproof breathable pipe penetrates through the two ends of the closed container, one end of the waterproof breathable pipe is connected to the first changeover valve, and the other end of the waterproof breathable pipe communicates with the weighing assembly through a third liquid storage pipe; the vacuum pump and the vacuum manometer are hermetically connected to the closed container, and the vacuum pump and the vacuum manometer are able to be communicatively connected to the control unit.

5. The oil-gas-water three-phase automatic metering device according to claim 4, wherein micropores are uniformly distributed on the wall of the waterproof breathable pipe, and the size of the micropores is larger than that of gas molecules and smaller than that of liquid molecules.

6. The oil-gas-water three-phase automatic metering device according to claim 1, wherein the water inlet assembly comprises a water inlet pipe and an open water receiver; the lower end of the water receiver is connected to the water inlet pipe, the water inlet pipe communicates with the upper end of the weighing assembly, the water inlet pipe communicates with the second changeover valve by a tee-junction, the water inlet pipe is provided with a valve, the valve is located below the tee-junction, and the valve is a solenoid and is able to be communicatively connected to the control unit.

7. The oil-gas-water three-phase automatic metering device according to claim 1, wherein the weighing assembly comprises an electronic scale and an open reservoir, the reservoir is placed on the electronic scale, and the electronic scale is able to be communicatively connected to the control unit.

8. The oil-gas-water three-phase automatic metering device according to claim 7, wherein the tail end of a pipeline, communicating with the reservoir, of the pump body, and the tail end of a pipeline, communicating with the reservoir, of the degassing assembly are located at the bottom of the reservoir.

9. An oil-gas-water three-phase automatic metering method based on the oil-gas-water three-phase automatic metering device according to claim 1, comprising the following steps:

step one, experiment preparation
a reservoir is filled with enough water, and all pipelines are filled with water by using a peristaltic pump, an initial detection weight of an electronic scale is recorded as $G_0$ by a control unit, a first changeover valve and a second changeover valve are switched to a pipeline circulation state that a first liquid storage pipe is in forward water drainage, a valve below a water inlet pipe is in an open state, a vacuum pump is turned on, and a closed container of a degassing system is kept at a vacuum pressure in the whole experiment process;

step two, forward water drainage
the to-be-measured fluid enters the first liquid storage pipe through a liquid inlet pipe for forward water drainage, with the time interval of r, and the detection weight of the electronic scale is recorded as $G_1$ by the control unit, then the weight increment of the single forward water drainage is $$\Delta = G_1 - G_0;$$

step three, combination of forward water drainage and reverse liquid drainage the first changeover valve and the second changeover valve are switched to a pipeline circulation state that a second liquid storage pipe is in forward water drainage, the valve is closed, the to-be-measured fluid enters the second liquid storage pipe for forward water drainage, and the drained water is collected into a water receiver; meanwhile, water is injected into the first liquid storage pipe by the peristaltic pump for reverse liquid drainage, then the to-be-measured fluid is gradually drained into a waterproof breathable pipe of the degassing system, then the to-be-measured fluid only has the oil-water fluid left as the gas-phase component thereof is removed by vacuumizing; when the volume of water drainage of the peristaltic pump is greater than the volume of the to-be-measured fluid but smaller than the volume of a third liquid storage pipe connected to the degassing system, the to-be-measured fluid completely enters the degassing system to complete degassing, but does not enter the reservoir; the stable detection weight of the electronic scale at the moment is recorded as $G_2$ by the control unit, the reduced weight of the water in the reservoir is $\Delta G_2 = G_1 - G_2$, and the reduced volume of the water is the volume of the gas in the to-be-measured fluid; the first liquid storage pipe is subjected to continuous drainage such that the to-be-tested fluid is completely drained into the reservoir from the liquid storage pipe, then the peristaltic pump is turned off, the stable detection weight of the electronic scale at the moment is recorded as $G_3$ by the control unit, the $\Delta G_3 = G_3 - G_0$, $\Delta G_3$ is the total mass of the oil and water in the section of to-be-measured fluid; after the $G_3$ is completely metered, the valve is opened, the water in the water receiver flows into the reservoir under the action of gravity, and meanwhile, the subsequent water subjected to forward drainage continuously flows into the reservoir to be weighed;

step four, calculation of the volume of oil, gas and water by forward and reverse drainage weighing method a calculation principle of the control unit is that the volume of this section of to-be-measured fluid entering the liquid storage pipe can be calculated by forward piston-like water drainage of the to-be-measured fluid and the weighing of the drained water; the to-be-measured fluid is drained into the degassing system by reverse water injection, thus degassing is completed and the volume occupied by original gas is filled with water; the gas phase volume in the to-be-measured fluid can be calculated by metering the reduced weight of water, the mass of the oil-water fluid can be obtained by completely draining and weighing the degassed oil-water fluid, and the volume of three-phase fluid in the to-be-measured fluid can be calculated respectively by combining the single-phase fluid density in the to-be-measured fluid;

a specific calculation method is as follows: assuming that the volume of the oil, gas and water in the to-be-measured fluid entering a certain liquid storage pipe are respectively $V_o$, $V_g$ and $V_w$ when the time interval is t, the densities of the oil and water are respectively known as $\rho_o$ and $\rho_w$, and the mass of the water drained in the forward water drainage stage of the section of to-be-measured fluid is $\Delta G_1 = G_1 - G_0$, thus $$\Delta G_1 = (V_o + V_g + V_w)\rho_w \qquad (1)$$

after the to-be-measured fluid is degassed, $\Delta G_2 = G_1 - G_2$, and at the moment, the reduced volume of the water in the reservoir is the volume of the gas in the to-be-measured fluid, thus $$V_g = \frac{\Delta G_2}{\rho_w} \quad (2)$$

after the degassed oil-water fluid is completely drained and weighed, the weight increased with respect to the original $G_0$ in the reservoir is $\Delta G_3 = G_3 - G_0$, then the real weight of the oil-water fluid can be obtained as follows:

$$\Delta G_3 = V_o \rho_o + V_w \rho_w \quad (3)$$

the volume $V_o$, $V_g$, $V_w$ of the oil, gas and water output in the experiment in the time interval t can be calculated by the joint solution of formulas (1), (2) and (3).

10. The oil-gas-water three-phase automatic metering method according to claim 9, wherein the time interval t is any duration which enables the total volume of single water drainage of forward water drainage to be smaller than the total volume of the first liquid storage pipe; when the degassed oil-water to-be-measured fluid is completely drained out from the third liquid storage pipe connected to the degassing system, the directions of the first changeover valve and the second changeover valve are switched at the same time to degas and meter the to-be-measured fluid entering the first liquid storage pipe and the second liquid storage pipe, respectively, and two parallel storage pipelines for the to-be-measured fluid are obtained through the switching of the first changeover valve and the second changeover valve, such that the forward water drainage and the reverse liquid drainage are able to be conducted at the same time to achieve continuous real-time metering of the to-be-measured fluid until the experiment is ended.

11. The oil-gas-water three-phase automatic metering method according to claim 9, wherein the first changeover valve is able to switch the communication between the liquid inlet pipe and the first liquid storage pipe to the communication between the liquid inlet pipe and the second liquid storage pipe while switching the communication between the degassing assembly and the second liquid storage pipe to the communication between the degassing assembly and the first liquid storage pipe; and the second changeover valve is able to switch the communication between the first liquid storage pipe and the water inlet assembly to the communication between the first liquid storage pipe and the pump body while switching the communication between the second liquid storage pipe and the pump body to the communication between the second liquid storage pipe and the water inlet assembly.

12. The oil-gas-water three-phase automatic metering method according to claim 9, wherein the first changeover valve and the second changeover valve are both planar four-way changeover valves, and the planar four-way changeover valves are communicatively connected to the control unit.

13. The oil-gas-water three-phase automatic metering method according to claim 9, wherein the degassing system comprises a closed container, a waterproof breathable pipe, a vacuum pump, and a vacuum manometer; the waterproof breathable pipe penetrates through the two ends of the closed container, one end of the waterproof breathable pipe is connected to the first changeover valve, and the other end of the waterproof breathable pipe communicates with the weighing assembly through a third liquid storage pipe; the vacuum pump and the vacuum manometer are hermetically connected to the closed container, and the vacuum pump and the vacuum manometer are able to be communicatively connected to the control unit.

14. The oil-gas-water three-phase automatic metering method according to claim 13, wherein micropores are uniformly distributed on the wall of the waterproof breathable pipe, and the size of the micropores is larger than that of gas molecules and smaller than that of liquid molecules.

15. The oil-gas-water three-phase automatic metering method according to claim 9, wherein the water inlet assembly comprises a water inlet pipe and an open water receiver; the lower end of the water receiver is connected to the water inlet pipe, the water inlet pipe communicates with the upper end of the weighing assembly, the water inlet pipe communicates with the second changeover valve by a tee-junction, the water inlet pipe is provided with a valve, the valve is located below the tee-junction, and the valve is a solenoid and is able to be communicatively connected to the control unit.

16. The oil-gas-water three-phase automatic metering method according to claim 9, wherein the weighing assembly comprises an electronic scale and an open reservoir, the reservoir is placed on the electronic scale, and the electronic scale is able to be communicatively connected to the control unit.

17. The oil-gas-water three-phase automatic metering method according to claim 16, wherein the tail end of a pipeline, communicating with the reservoir, of the pump body, and the tail end of a pipeline, communicating with the reservoir, of the degassing assembly are located at the bottom of the reservoir.

18. The oil-gas-water three-phase automatic metering method according to claim 11, wherein the time interval is any duration which enables the total volume of single water drainage of forward water drainage to be smaller than the total volume of the first liquid storage pipe; when the degassed oil-water to-be-measured fluid is completely drained out from the third liquid storage pipe connected to the degassing system, the directions of the first changeover valve and the second changeover valve are switched at the same time to degas and meter the to-be-measured fluid entering the first liquid storage pipe and the second liquid storage pipe, respectively, and two parallel storage pipelines for the to-be-measured fluid are obtained through the switching of the first changeover valve and the second changeover valve, such that the forward water drainage and the reverse liquid drainage are able to be conducted at the same time to achieve continuous real-time metering of the to-be-measured fluid until the experiment is ended.

19. The oil-gas-water three-phase automatic metering method according to claim 12, wherein the time interval is any duration which enables the total volume of single water drainage of forward water drainage to be smaller than the total volume of the first liquid storage pipe; when the degassed oil-water to-be-measured fluid is completely drained out from the third liquid storage pipe connected to the degassing system, the directions of the first changeover valve and the second changeover valve are switched at the same time to degas and meter the to-be-measured fluid entering the first liquid storage pipe and the second liquid storage pipe, respectively, and two parallel storage pipelines for the to-be-measured fluid are obtained through the switching of the first changeover valve and the second changeover valve, such that the forward water drainage and the reverse liquid drainage are able to be conducted at the same time to achieve continuous real-time metering of the to-be-measured fluid until the experiment is ended.

20. The oil-gas-water three-phase automatic metering method according to claim 13, wherein the time interval is any duration which enables the total volume of single water drainage of forward water drainage to be smaller than the total volume of the first liquid storage pipe; when the degassed oil-water to-be-measured fluid is completely drained out from the third liquid storage pipe connected to the degassing system, the directions of the first changeover valve and the second changeover valve are switched at the same time to degas and meter the to-be-measured fluid entering the first liquid storage pipe and the second liquid storage pipe, respectively, and two parallel storage pipelines for the to-be-measured fluid are obtained through the switching of the first changeover valve and the second changeover valve, such that the forward water drainage and the reverse liquid drainage are able to be conducted at the same time to achieve continuous real-time metering of the to-be-measured fluid until the experiment is ended.

* * * * *